United States Patent [19]

Dischert et al.

[11] 4,209,801

[45] Jun. 24, 1980

[54] SYSTEM FOR INCREASING THE SHARPNESS IN A TELEVISION PICTURE

[75] Inventors: Robert A. Dischert, Burlington; William J. Cosgrove, Marlton, both of N.J.

[73] Assignee: RCA Corporation, New York, N.Y.

[21] Appl. No.: 901,822

[22] Filed: May 1, 1978

[30] Foreign Application Priority Data

May 30, 1977 [GB] United Kingdom ............... 22803/77

[51] Int. Cl.² ...................... H04N 9/535; H04N 9/539
[52] U.S. Cl. ................................................... 358/37
[58] Field of Search ..................... 358/37, 51, 50, 162, 358/166, 52

[56] References Cited

U.S. PATENT DOCUMENTS

| 3,546,372 | 12/1970 | Dischert et al. | 358/37 |
| 3,681,520 | 8/1972 | Schneider | 358/37 |
| 3,732,360 | 5/1973 | Breimer et al. | 358/37 |

Primary Examiner—John C. Martin
Attorney, Agent, or Firm—Eugene M. Whitacre; Joseph S. Tripoli; Robert L. Troike

[57] ABSTRACT

The system herein for use in a television camera system normally generates contour correction signals from the green video signals but when the green video signal level falls below a predetermined level, the contour correction signals are also generated from the red video signal. The system allows for normal misregistration of the camera by extending the green video signal beyond the normal time period and by delaying the red video signal approximately one-half the amount the green video signal is extended to center the red signal with respect to the extended green video signal. The extended green video signal and delayed red video signals are compared and when the delayed red video signal amplitude exceeds the green video signal amplitude by a predetermined amount the difference signal contributes to the generation of the contour correction signals.

10 Claims, 5 Drawing Figures

SYSTEM FOR INCREASING THE SHARPNESS IN A TELEVISION PICTURE

BACKGROUND OF THE INVENTION

This invention relates to a color television camera system and more particularly to contour enhancement in a color television camera which has the effect of subjectively increasing the picture sharpness.

Present day broadcast color television cameras use some form of "aperture correction" or "contour correction" to have the effect of increasing the picture sharpness. This correction, often referred to as "contour correction" corrects for the apparent loss of resolution in the system due to, for example, the horizontal and vertical high frequency response of the image pickup devices and display devices. In cameras using red, green and blue camera pickup devices, the high frequency horizontal and vertical spatial information from the green signal is extracted and after amplification, this high frequency spatial information is added back to each of the three color signals or directly to the luminance signal. The use of the green signal only is to prevent misregistration enhancement. The problem with this system is that scenes containing little or no green information appear soft or lacking in sharpness (lacking in detail).

Although systems which sense the red, green and blue camera signals having the largest amplitude and using that signal to provide the aperture or contour correction are known, this type of system would produce false edge information when there was minor misregistration. In fact, such a system would produce enhancement of this misregistered signal.

SUMMARY OF THE INVENTION

Briefly, the system described herein generates a contour correction signal primarily from a second (red, for example) video signal when the first (for example green) video signal is below a predetermined level. The time period of the first video signal is extended beyond its normal time period and this first video signal is subtracted from a delayed second video signal at a summing means. The second video signal is delayed approximately one-half the amount the first video signal is extended so the second signal is centered with respect to the extended first signal to form a guard band that is well within the normal registration stability of the camera. One polarity of the difference signal from the summing means contributes to the generation of the contour correction signal if the amplitude of the second video signal is substantially above the amplitude of the first video signal.

DESCRIPTION OF THE INVENTION

Figure 2:
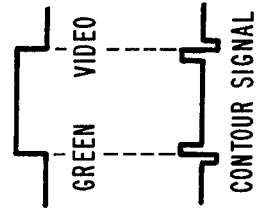
FIG. 2 illustrates waveforms associated with the prior art system of FIG. 1.
Figure 1:
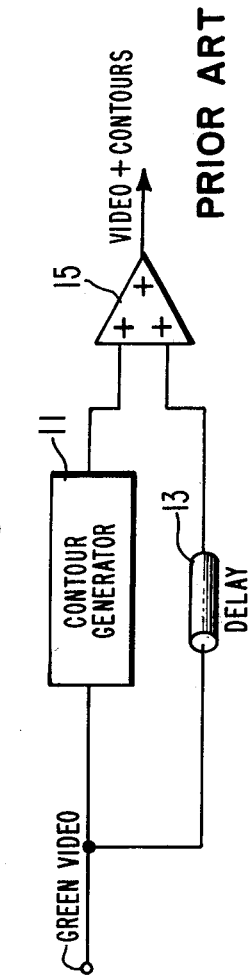
FIG. 1 is a block diagram of a contour correction system according to the prior art.

Referring to FIG. 1, in accordance with the prior art, the green video signal is applied to the contour generator 11 and to delay line 13. The contour generator 11 extracts the high frequency video information from the green video signal, amplifies this high frequency information and applies this resulting signal to summer 15. The delay 13 approximates the delay in the contour generator 11 and couples the green video signal to the summer 15. The output of the summer 15 is the green video signal plus the contours. The video and the contours are illustrated in FIG. 2. This high frequency information from the contour generator is coupled back to all three color video signals or may be applied directly to the luminance signal.

Figure 3:
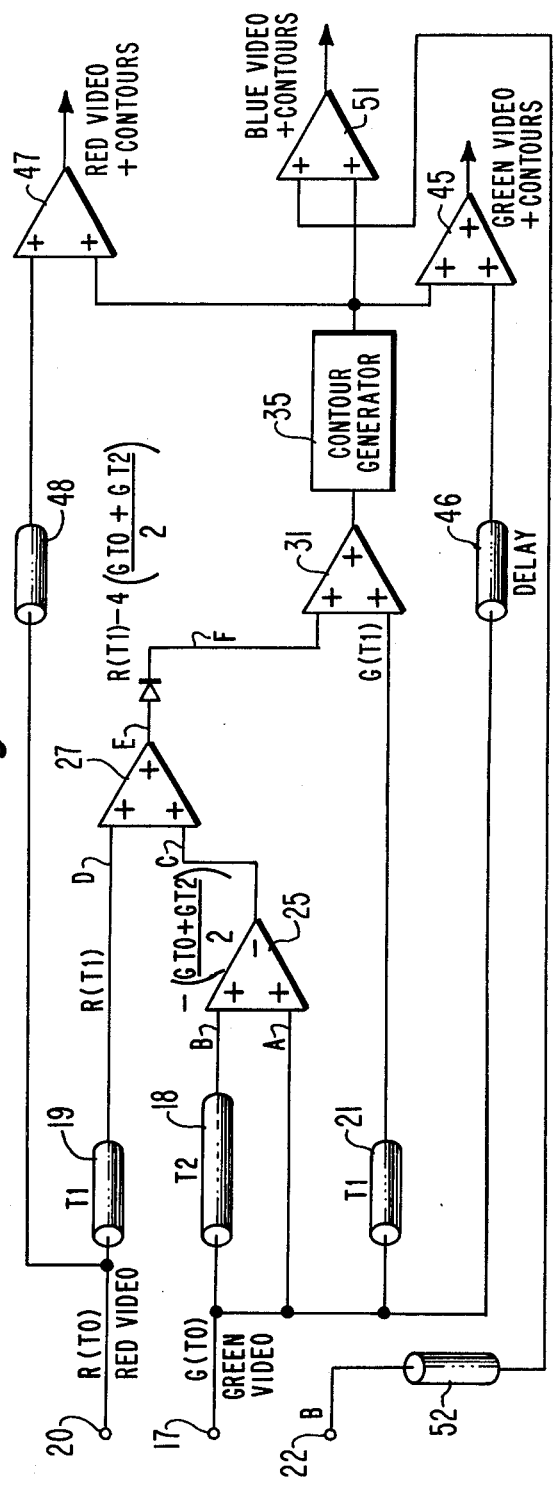
FIG. 3 is a system diagram for increasing the sharpness in a color television picture according to the present invention.

Referring to FIG. 3, there is illustrated a system that allows the contour signal to be generated from a misregistered red video signal. The green video signal from the image pickup device is applied to terminal 17. An undelayed green video signal at point A (GT0) and a delayed green video signal at point B (GT2) are summed in a 1 to 1 ratio at summer 25. The green video signal at point B is delayed in delay line 18 a time period of T2 which is, for example, 280 nanoseconds. This time period of 280 nanoseconds is twice that time period or T1 within which there is to be provided a guard band. This guard band is related to the normal registration stability of the camera. The undelayed green signal at point A and the delayed green signal at point B are inverted at summer 25 to obtain the signal at point C which may be represented by the equation $$\frac{GT0 + GT2}{2}$$

with the gain at summer being $\frac{1}{2}$.

The red video signal at terminal 20 is delayed a time T1 via delay line 19 to point D. The delay T1 provided by the delay line 19 is approximately one-half T2 or one-half the delay provided by the delay 18 (140 nanoseconds for the example). The signal at point C is then subtracted from the signal at point D in a 1 to 4 ratio in algebraic summer 27 to provide the signal at point E. The signal at point E may be represented by the equation $$R(T1) = 4\left(\frac{GT0 + GT2}{2}\right)$$

The signal at point E is DC coupled to a clipper represented by diode 30 to allow only the positive half of the signal to be applied to point F. The signal at point F is then applied to the summer 31.

The green video signal from terminal 17 is also delayed a time T1 by a delay 21 to the summer 31. The summed green video signal and that portion of the red which is provided at point F is provided to a contour generator 35 which operates in the same manner as contour generator 11 in FIG. 1. Also, the green video signal is delayed via a delay line 46 that operates like delay line 13 in FIG. 1 to the summer 45. The contour generators 11 and 35 used herein may be like those described by Dischert, et al. in U.S. Pat. No. 3,546,372. The system herein generates the horizontal contour signals only. The delay 46 is selected to be equal to the total delay in the contour generator 35 and all of the delays in the system between terminal 17 and generator 35. The contour generated signal is summed with the green video signal at the summer 45. The output from summer 45 is the aperture corrected green video signals.

A red aperture corrected signal is provided by summing the contour generated signal from generator 35 with the delayed red video signal at summer 47. The red video signal is delayed by delay 48 which like delay 46 equals the total delay in the contour generator 35 and the circuitry between terminal 20 and the contour generator 35.

A blue aperture corrected signal is provided by summing the contour generated signal from generator 35 with the delayed blue video signal at summer 51. The blue video signal from the camera at terminal 22 is delayed by delay 52 to correct for the delays in the contour generator 35 and the processing circuit from terminal 17 to the contour generator 35.

The operation of the system is like that in FIG. 1 unless the amplitude level of the red video signal exceeds twice the amplitude level of the green video. Unless the red video exceeds twice the green video, the red video signal is insufficient to provide any signal at point F and the green video signal is applied via the summer 31 to the contour generator 35 and the high frequency information generated is summed with the delayed green video signal at the summer 45.

Figure 4:
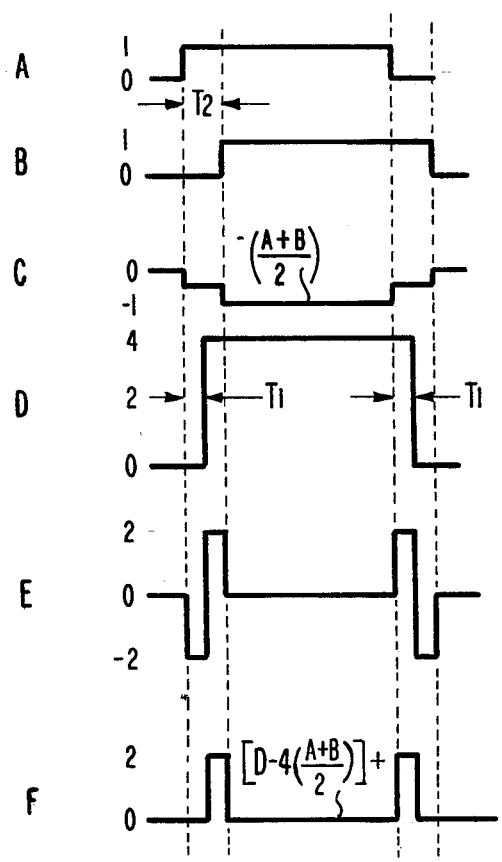
FIG. 4 illustrates idealized waveforms that are associated with the system of FIG. 3 when a camera is viewing a scene that contains both red and green positive transitions occurring at the same time where the information is predominantly red.

The operating condition when the information is predominantly red is illustrated in FIG. 4. Waveforms A and B of FIG. 4 illustrate the signal levels at points A and B, respectively. As can be seen, the signal at point B is delayed in time by an amount T2. The signal at point C is the inverted sum signal of the signals at points A and B as illustrated by waveform C of FIG. 4. Waveform D of FIG. 4 illustrates the red video signal at point D. Waveform E of FIG. 4 illustrates the waveforms at point E (sum of signals four times C and D) for illustration purposes with signal C given the weighted value of four or 4×C. Waveform E of FIG. 4 illustrates that the red and green transitions may be misregistered by an amount ±T1 before any false information can be produced by the subtraction process. This ±T1 guard band is well within the normal registration stability of the camera. The clipper 30 eliminates the unwanted negative green signals to produce the signal at point F for generating contours from red video signals. The signal at point F is illustrated by waveform F of FIG. 4. The signal at point F is represented mathematically as $$\left[ D - 4\left(\frac{A+B}{2}\right) \right] +$$

The plus symbol (+) in this equation symbolizes that only the positive polarity difference signal is provided out of the clipper 30.

Figure 5:
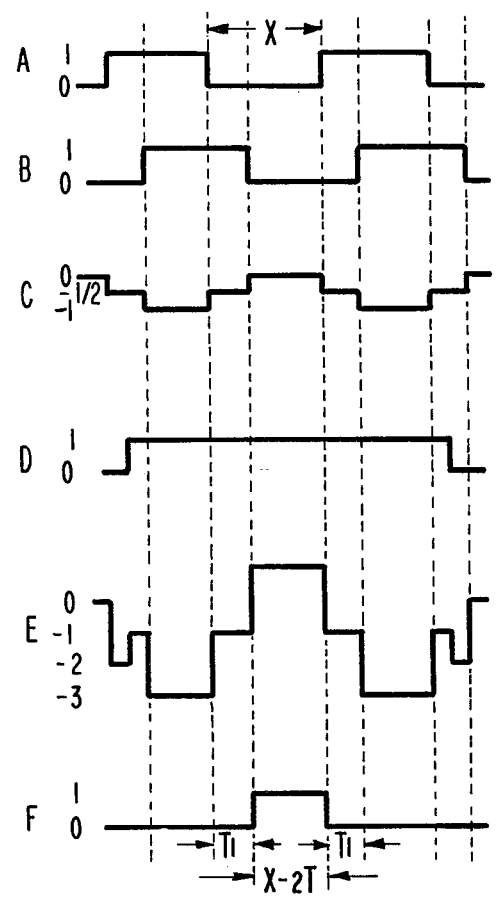
FIG. 5 illustrates idealized waveforms that are associated with the system of FIG. 3 when the camera is viewing a scene that randomly switches between red and green information when the edges do not occur at the same time.

Referring to FIG. 5, there is illustrated how the system of FIG. 3 operates when the scene randomly switches between the red and the green information when the edges do not occur at the same time. The signals at points A, B, C and D combine as before to form when clipped the signal waveform F in FIG. 5 that has its edges displaced from the green signal by a time T1. The combination of these signals whose edges are displaced by an amount exactly equal to time T1 produce a symmetrical contour signal at this transition which has the effect of subjectively increasing the picture sharpness.

As noted over the time period of X in FIG. 5, the green signal level illustrated in waveforms A, B and C of FIG. 5 drops considerably and the red signal level as illustrated by waveform D of FIG. 5 is constant over that time period. Waveform E of FIG. 5 illustrates the waveform at point E (sum of waveforms 4×C and D) for illustration purposes. As can be seen, the red video signal over the time period of X-2T1 contributed to the contour signal even though the green signal is only reduced momentarily. It is to be noted that the green signal levels when compared to the red are summed and then divided by four. There is, therefore, a 2 to 1 amplitude ratio between the green and the red signals such that before red would contribute to the contour generation, its value would have to be twice that of the green video. This is the approximate proportion of red video and the green video to the luminance signal. In the system the delay T1 should be equal to approximately one half cycle of the contour peaking frequency. For example, for a horizontal contour at 3.5 MHz the delay is 140 nanoseconds. Referring to FIG. 5, for example, when the video goes from yellow (pressure of green and red) to red during the transition time X, the total luminance level is decreased over time X. Within this time period red contours are being generated. Since the delay T1 before the red transition occurs is approximately equal to one half cycle of the peaking frequency, the signals are reinforced rather than soft.

What is claimed is:

1. A contour correction system for use in a color television system having means for furnishing at least first and second camera signals for increasing the sharpness of the reproduced image even when the first signal level falls below a predetermined level, said contour correction system comprising in combination:
   a contour correction means responsive to the video information applied thereto for extracting the high frequency video information for adding this high frequency information to the first and second camera signals;
   means coupled to said first and second camera signals for selecting the video to be applied to said contour correction means, said selection means including means for extending said first video camera signal a given time duration;
   means for delaying the second video signal approximately one half said given time duration; and
   means responsive to said delayed second video signal level exceeding the extended first video signal level by a predetermined amount for providing a portion of the second video signal to said contour correction means.

2. The combination of claim 1 wherein said first camera signal is the green camera signal and the second camera signal is the red camera signal.

3. The combination claimed in claim 2, wherein said predetermined amount corresponds to the condition wherein said red video signal level is at least twice the green video signal level.

4. The combination of claim 2, wherein said means for extending the green video signal a given time duration includes means for summing a delayed green signal with an undelayed green signal.

5. The combination of claim 4, wherein said delayed green signal is delayed a time period of T2 while the red video is delayed a time period T1 equal to one-half that of T2.

6. The combination of claim 5, wherein said delay time period T2 is approximately 280 nanoseconds.

7. The combination of claim 5, wherein the time period T1 is approximately equal to one-half the contour peaking frequency.

8. A contour correction system for use in a color television system providing at least two separate color camera signals for increasing the sharpness of the reproduced image, said contour correction system comprising:

a contour correction generator means responsive to said camera signals for generating contour correction signals, means for always applying one of said camera signals to said contour generator means for generating contour correction signals, means responsive to the signal level of the one camera signal being a predetermined level below the signal level of the other camera signals for applying a difference signal between said two camera signals to said contour generator means, said last-mentioned means including means for extending the time duration of one of said camera signals, means for delaying the other camera signals and means for comparing amplitude levels of said extended camera signals and said delayed signal to obtain said difference signal.

9. The combination of claim 8, wherein said one camera signal is the green camera signal and the other camera signal is the red camera signal and said green camera signal is extended and said red camera signal is delayed.

10. The combination of claim 9 including means coupled to said contour generator means and responsive to said contour correction signals therefrom for adding the contour correction signals to the green and red video signals.

* * * * *